Jan. 1, 1952  R. V. GANZ  2,581,248
METHOD OF MAKING FORMS FOR THE MANUFACTURE
OF DIPPED RUBBER GOODS OR OTHER ARTICLES
Filed April 28, 1948  2 SHEETS—SHEET 1

INVENTOR.
RUDOLPH V. GANZ
BY
*Ely & Frye*
Attorneys

Jan. 1, 1952 R. V. GANZ 2,581,248
METHOD OF MAKING FORMS FOR THE MANUFACTURE
OF DIPPED RUBBER GOODS OR OTHER ARTICLES
Filed April 28, 1948 2 SHEETS—SHEET 2
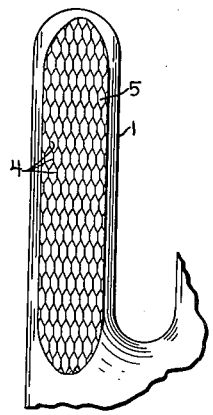
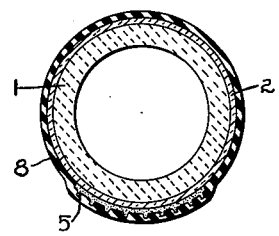
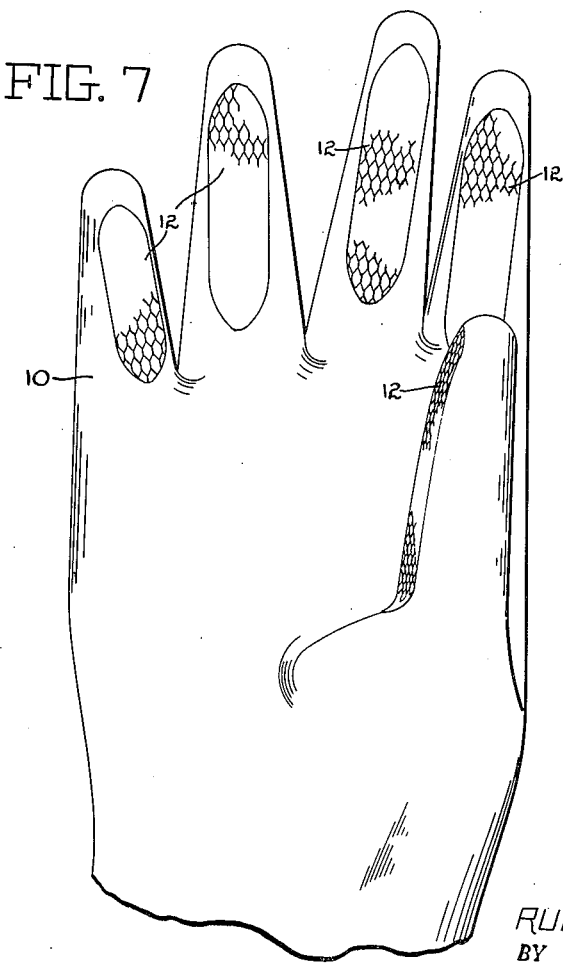
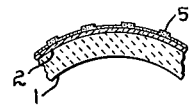
INVENTOR.
RUDOLPH V. GANZ
BY Ely & Frye
Attorneys Patented Jan. 1, 1952

2,581,248

UNITED STATES PATENT OFFICE 2,581,248

METHOD OF MAKING FORMS FOR THE MANUFACTURE OF DIPPED RUBBER GOODS OR OTHER ARTICLES

Rudolph V. Ganz, Akron, Ohio, assignor to The Colonial Insulator Company, Akron, Ohio, a corporation of Ohio Application April 28, 1948, Serial No. 23,658

14 Claims. (Cl. 41—26)

The present invention has as its primary object a method of manufacturing forms intended for use in the making of rubber goods by dipping processes. The invention has been developed because of the inability of manufacturers of rubber gloves to produce satisfactory rubber gloves having roughened areas on the surfaces of the gloves. The present invention relates primarily to a method of forming roughened areas on a form which is used for the manufacture of the goods by dipping, these areas being reproduced on the glove or other product so that the roughened surfaces complementary to the roughened areas in the form appear when the glove or other article is stripped from the form after the curing operation.

While the invention was designed to meet the need for some means of manufacturing rubber gloves with roughened areas, it is evident that the method involved is also applicable to the general art of decorating glazed porcelain articles or indeed articles of any body material.

The invention will be described with particular reference to the method of making porcelain rubber glove forms with isolated roughened areas on the fingers of the form, but it is to be distinctly understood that the invention is in no wise limited to this particular use.

In the drawings showing the embodiment of the invention which has been selected for illustration:

Fig. 4 is a view showing the patch or carrier completely removed and the irregulator deposit in place on a section of the form;

Fig. 5 is an enlarged cross-section through the form;

Fig. 6 is a section through one of the fingers showing the layer of rubber as it is deposited over the form by the dipping operation; and Fig. 7 is a view showing the finished glove.

Figure 1:
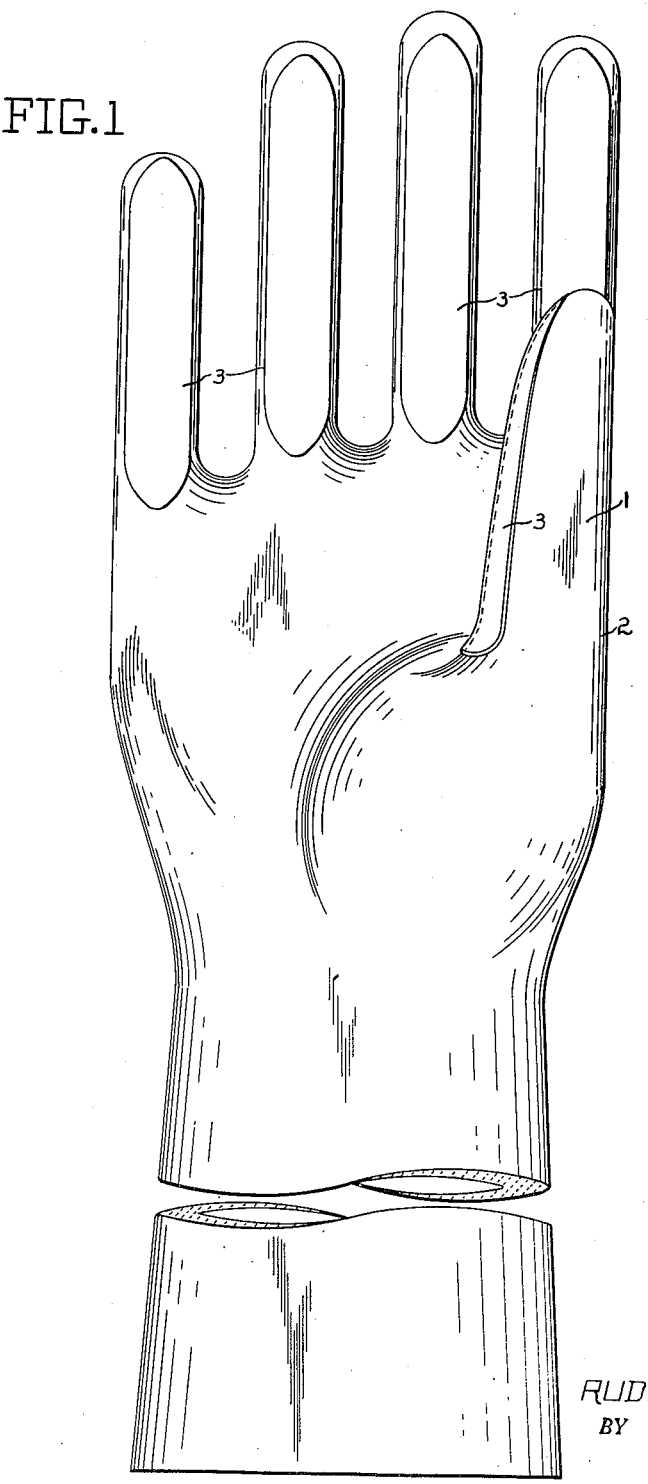
Fig. 1 is an elevation of a standard rubber glove form with the patches applied thereto which carry the material which is to be deposited on the glazed surface of the form.

No attempt has been made in the drawings to show exact dimensions, it having been necessary to exaggerate certain dimensions in order to illustrate the invention.

In the manufacture of dipped rubber goods, it is usual to employ a porcelain form which is given a baked coating of vitreous glaze or enamel which imparts the smooth lustrous surface to goods made thereon, and it is in connection with the use of such forms that the invention has been especially developed. However, metal forms have been proposed as substitutes for porcelain forms and these forms have been provided with various types of glazed or enameled surfaces formed by enamels, resins or heat-resistant coatings and the principles of this invention may be extended to such forms.

A hollow rubber glove form of the porcelain type is shown at 1 and, in one form of the invention, is provided with the usual vitreous glazed surface or outer layer 2. This glaze may be of any of the well-known types or compositions, it being essential merely that the glaze be smooth and impervious and that it be able to withstand any of the ingredients which may be employed in the rubber dips.

In order to provide for roughened areas on the form, which reproduce roughened areas on the glove, I form patches of a flexible material, at least one surface of which is provided with numerous small recesses or pockets of the intended design. It is necessary that this material for these patches be flexible and that it is sufficiently water resistant so as to hold its shape and body during the succeeding steps of the process.

A paper stock may be employed, but for the best results I prefer to use a thin sheet of rubber as this material will not be affected by the process and is sufficiently flexible so that it may be shaped about the form and easily stripped or peeled from the deposit made on the form, as will be explained.

At least one surface of the sheet is roughened in the case of rubber by molding a plurality of pockets or recesses on the face of a sheet which is then cut into the patches of the desired size and shapes. Such a patch is indicated at 3. Recesses are indicated at 4 on one surface of the rubber patch. In the case of other patch materials the roughened design may be embossed or stippled on the surface of the patch. The form of the design is immaterial, the drawing showing a multiplicity of closely spaced hexagonal figures as these will produce excellent non-slipping areas on the finished glove. If the process is used for the application of ornamental figures or designs the configuration of the patch and the design formed thereon will be changed accordingly.

The patches are placed on a board or other flat surface with the roughened areas uppermost and over these patches is spread a thin clay slip which fills the pockets and recesses and is then smoothed off by a spatula or other flat instrument level with or slightly above the crests of the ridges which form the pockets. Such a deposit is indicated on the drawings as 5. The clay slip is relatively thin so that it will flow readily into the recesses or crevices on the surface of the patch.

For the subsequent adherence of the clay to the glazed surface of the form, a suitable material should be added to the slip which will, during the subsequent heat treatment, fuse or amalgamate with the glazed surface. For this purpose a thin, vitreous composition of any well-known type may be added to the clay slip, especially if it is desirable to have a luster finish on the roughened areas of the form. It has been found that water glass added to the slip creates the proper adherence between the clay and the surface of the form. Other adhesives may be used provided that in the subsequent baking the requisite adhesion is produced.

After the patches are covered with an even deposit of the clay slip, they are allowed to dry until the clay has assumed a coherent character. This can be told by observation of the surface of the patch, the clay being dried sufficiently when it has reached a paste-like consistency which is characteristic of partial drying.

The patches are then carefully removed from the board or table on which they are lying, usually by inserting a thin blade between the board and the underside of the patches. The patches are then applied to the surface of the form which has the glazed surface and carefully smoothed and shaped to the surface so that patches adhere at the points where the roughened areas are to appear.

Figure 2:
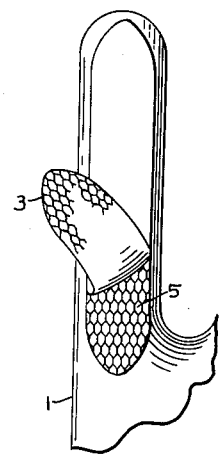
Fig. 2 is a view showing the stripping of the patches to leave the deposits adhering to the glazed surface of the form.
Figure 3:
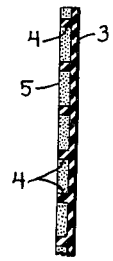
Fig. 3 is an enlarged cross-section through a fragment of a patch or carrier.

The forms are now allowed to stand until the clay slip has thoroughly dried in position on the form. When this point has been reached the patches are peeled away in the manner shown in Fig. 2 leaving the clay in the form which has been imparted to it by the roughened area of the patch. It is desirable, of course, to remove the patch without disturbing or destroying the pattern imparted to the clay deposit, therefore the patch material should be such that none of the dried clay will adhere to the surface of the patch. This will produce a sharply defined reproduction of the surface of the patch. Rubber sheeting is admirably adapted for this purpose, and the best results are obtained by peeling the patches on a rather sharp curve as shown in Fig. 2.

The form is now ready for the second firing operation which bakes the clay deposit on the already glazed surface of the form. It is desirable, in the second firing operation, to use temperatures which are not appreciably higher than the temperature which was used in the first firing operation when the original glaze was baked on the form. The temperatures may be lower in the firing of the clay deposit than in the original but for economy in operation the clay deposit is usually baked at the same temperature as used in the original glazing operation so that the forms treated in the manner described may be run through the baking oven or kiln together with other forms which are being baked for the first time.

During the baking of the clay deposit the water glass or other adhesive material will fuse with or on the original glazed surface so that the clay deposit will not easily separate or chip from the glaze surface underlying it. As clearly shown in Figs. 5 and 6, the firing operation causes the clay deposit to fuse with the glaze without destroying the glazed surface.

In Fig. 5 a fragment of a finished roughened form is shown in which the numeral 5 represents the baked clay deposit.

It is obvious that any type of ceramic material may be used as the slip which is placed over the roughened surfaces of the patch and I am not limited to the use of clays of any particular type so long as they will bake properly. Nor am I limited to any particular type of adhesive ingredient for addition to the clay, so long as it will serve as a medium to cause the baked clay deposit to adhere to the form. It is possible with certain ceramic compositions which will of themselves fuse with the glaze to dispense with the use of an additional bonding agent. All of these variations are fully comprehended in the broad scope of this invention.

After the form is fired for the second time, it is used in any of the well-known methods of making goods thereon. In Fig. 6 a section of the form is shown with a layer or coating of rubber 8 surrounding the form and the roughened deposit thereon. In the manufacture of rubber gloves, bathing caps or other similar thin rubber goods, this will be done by dipping the form in a solution or dispersion of rubber which is allowed to deposit thereon, filling the depressions and recesses forming the design, whether it be a geometrical pattern such as illustrated or an ornamental design such as might be applied to bathing caps, for example.

After curing the article is stripped from the form which brings the roughened surface on the exterior of the finished article. A rubber glove 10 is shown as the example in Fig. 7, the roughened areas on the fingers and ball of the thumb being indicated at 12.

The form shown herein may be used for the manufacture of goods from other compositions than rubber.

As a variation of the process, the form illustrated in Fig. 1 may be unbaked at the time the patches are applied thereto. In such a variation of the process the patches with the partially dried slip thereon are applied at the desired points, the article is allowed to dry and is then dipped in the glazing solution. The glaze is allowed to dry and then the patches are removed exposing the unglazed roughened areas of the clay deposit. The forms are then fired which gives an integral form with isolated roughened areas which form the roughened areas in the finished glove. This process is covered in applicant's copending application, Serial No. 33,753, filed June 18, 1948. If desired for certain purposes the glazing operation may be omitted.

As suggested herein the invention is in no way limited to the making of forms for roughened rubber gloves, decorated rubber bathing caps or rubber goods generally. It is equally applicable to the manufacture of decorated porcelain or ceramic ware or to decorated glazed articles of any body material in which the article itself is the commercial or end product.

This application is a continuation in part of applicant's copending application, Serial No. 21,057, filed April 14, 1948, now abandoned.

What is claimed is:

1. The method of providing a form with a roughened area comprising, providing a flexible sheet material with a plurality of depressed designs to be reproduced on the form, covering the sheet with a thin ceramic slip and smoothing the upper surface thereof, drying the sheet until the slip assumes a paste-like consistency, applying and conforming the sheet to the surface of the form with the partially dried slip in contact with said surface, drying the slip, peeling the sheet from the dried ceramic deposit which remains on the form, and then heating the form to a temperature sufficient to bake the ceramic material.

2. The method of providing an article having a previously glazed surface with raised formations comprising providing a flexible sheet material with a depressed design corresponding to the raised formations aforesaid, filling the design on the sheet with a wet ceramic deposit, allowing the deposit to dry partially, applying and conforming the sheet over the glazed surface with the partially dried ceramic in contact therewith, drying the deposit, removing the sheet from the surface of the deposit which remains on the article and firing the article to bake the ceramic deposit.

3. The method of providing an article having a previously baked vitreous glaze thereon with raised formations comprising providing a flexible water-resistant sheet with depressions corresponding to the design of the said raised formations, coating the surface of the sheet with a wet ceramic deposit so that the depressions therein are filled, said ceramic deposit including a material which will fuse to the vitreous glaze, partially drying the deposit, placing the sheet with the partially dried deposit in contact with the glaze conforming the sheet to the surface of the article, drying the deposit, removing the sheet and leaving the deposit on the article, and then baking the article to set the ceramic deposit and cause it to adhere to the glazed surface.

4. The method of providing an article having a previously baked vitreous glaze thereon with a roughened area, comprising forming a flexible water-resistant sheet with a multiplicity of depressions, filling the depressions with a clay slip containing a material having an affinity for the glaze, partially drying the slip, laying the sheet with the slip in contact with the glazed surface of the article, conforming the sheet to the surface of the article, drying the slip and then peeling the sheet from the dried clay slip which remains on the article and baking the article to set the slip and cause it to adhere to the glazed surface.

5. The method of providing a ceramic article with a roughened area, comprising forming a flexible sheet with a multiplicity of depressions, filling the depressions with a clay slip, partially drying the slip, laying the sheet with the slip in contact with the surface of the article, conforming the sheet to the surface of the article, drying the slip and then peeling the sheet from the dried clay slip which remains on the article, and baking the article to set the slip and unite it with the body of the article.

6. The process of making a form for dipped rubber goods or the like, said process comprising providing a patch of rubber sheeting having a design embossed thereon, filling the recesses of the design with a wet ceramic slip, bringing the slip to a partially dried state, applying the patch and shaping it to the form and allowing the slip to dry, peeling the patch therefrom, leaving the dried slip on the form and then baking the form.

7. The process of making a form for dipped rubber goods having a previously applied and baked vitreous outer layer, said process comprising, providing a patch of rubber sheeting having a design embossed thereon, filling the recesses of the design with a wet ceramic slip having an ingredient which will fuse with the said outer layer, bringing the slip to a partially dried state, applying the patch and shaping it to the vitreous outer layer and allowing the slip to dry, peeling the patch therefrom, leaving the dried slip on the form and then baking the slip.

8. The process of making a form for dipped rubber goods having a previously applied and baked vitreous outer layer, said process comprising, providing a patch of flexible water-resistant sheet material having a design embossed thereon, filling the recesses of the design with a wet ceramic slip, bringing the slip to a partially dried state, applying the patch and shaping it to the vitreous outer layer and allowing the slip to dry, peeling the patch therefrom, leaving the dried slip on the form and then baking the slip.

9. The process of making a form for dipped rubber goods or the like, said process comprising providing a patch of flexible sheet material having a design embossed thereon, filling the recesses of the design with a wet ceramic slip which will fuse with the body of the form, bringing the slip to a partially dried state, applying and conforming the patch to the form and allowing the slip to dry, peeling the patch therefrom, leaving the dried slip on the form and then baking the form.

10. The method which comprises applying to a base of vitreous material having a glazed surface, a preformed layer of a vitrefiable material formed to present a design, said layer being supported on a flexible backing, shaping the backing to the base, removing the backing, baking to vitrefy said layer and fuse said glaze to thereby unite said layer to said base, the baking temperature being sufficient to vitrefy the layer and fuse the underlying glaze but not sufficient to destroy the identity of said glaze in the co-extensive area between the base and layer, and cooling to solidify the fused union between said glaze and said layer.

11. The method which comprises applying to a base of vitreous material having a glazed surface a preformed layer of vitrefiable material formed to present a design, said layer being supported on a flexible backing, shaping the backing to the surface, removing said backing, baking to vitrefy said layer and fuse said glaze to thereby unite said layer to said base, the baking temperature being sufficient to vitrefy the layer and fuse the underlying glaze but not sufficient to destroy the identity of said glaze in the co-extensive area between the base and layer, and cooling to solidify the fused union between said glaze and said layer.

12. The method which comprises applying and shaping to a previously fired base of vitreous material having a glazed surface a preformed layer of unfired vitrefiable material formed to present a design, said layer being mounted on a backing, drying the vitrefiable material of said layer, removing the backing, baking to vitrefy said layer and fuse said glaze to thereby unite said layer to said base, the baking temperature being sufficient to vitrefy the layer and fuse the underlying glaze but not sufficient to destroy the identity of said glaze in the co-extensive area between the base and layer, and cooling to solidify the fused union between said glaze and said layer.

13. The method which comprises applying to a previously fired base of vitreous material having a glazed surface a preformed layer of unfired vitrefiable material formed to present a design, said layer being mounted on a flexible backing, shaping the backing to the surface, drying the vitreflable material of said layer, removing the backing, baking to vitrefy said layer and fuse said glaze to thereby unite said layer to said base, the baking temperature being sufficient to vitrefy the layer and fuse the underlying glaze but not sufficient to destroy the identity of said glaze in the co-extensive area between the base and layer, and cooling to solidify the fused union between said glaze and said layer.

14. The method which comprises applying to a previously fired base of vitreous material having a glazed surface a preformed layer of unfired vitrefiable material formed to present a design, said layer being mounted on an elastic backing, shaping the backing to the surface, drying the vitreflable material of said layer, removing the backing, baking to vitrefy said layer and fuse said glaze to thereby unite said layer to said base, the baking temperature being sufficient to vitrefy the layer and fuse the underlying glaze but not sufficient to destory the identity of said glaze in the co-extensive area between the base and layer, and cooling to solidify the fused union between said glaze and said layer.

RUDOLPH V. GANZ.

REFERENCES CITED

The following references are of record in the file of this patent:

UNITED STATES PATENTS

| Number | Name | Date |
|---|---|---|
| 207,543 | Niedringhause | June 1, 1878 |
| 493,449 | Schmalz | Mar. 14, 1893 |
| 1,410,169 | Criner | Mar. 21, 1922 |
| 1,516,065 | Scott et al. | Nov. 18, 1924 |
| 1,907,771 | Fellner | May 9, 1933 |
| 2,261,583 | Hemphill | Nov. 4, 1941 |
| 2,316,149 | Bates | Apr. 13, 1943 |
| 2,334,307 | Bauer | Nov. 16, 1943 |
| 2,384,741 | Hemphill | Sept. 11, 1945 |
| 2,441,164 | Miller | May 11, 1948 |